Jan. 29, 1935. B. F. FORTIER ET AL 1,989,637
METHOD OF ATTACHING BACK BAR TO FRONT MEMBER OF A BUMPER
Filed Dec. 4, 1931 2 Sheets-Sheet 1
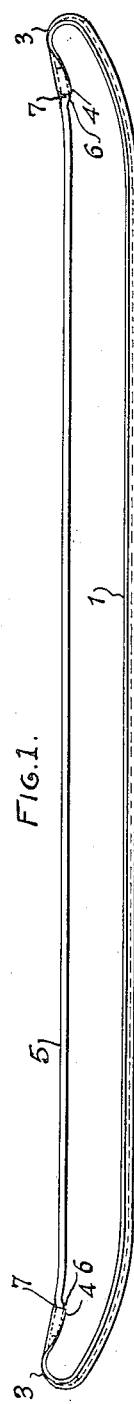
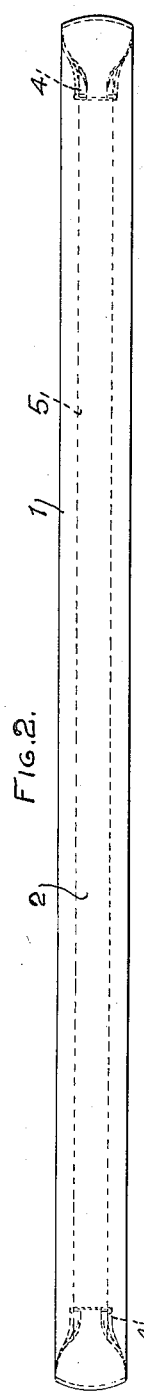
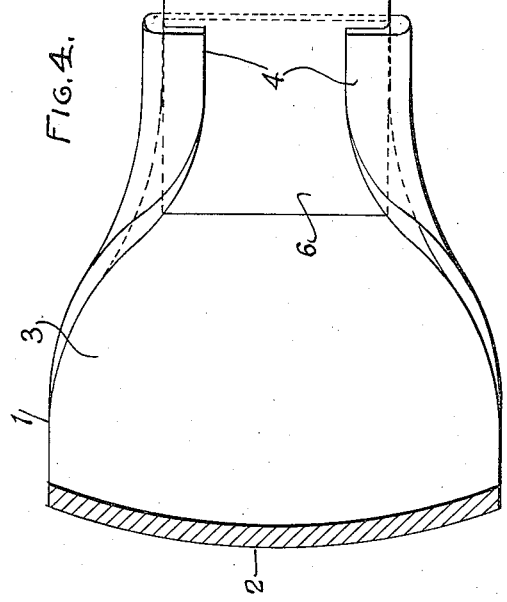
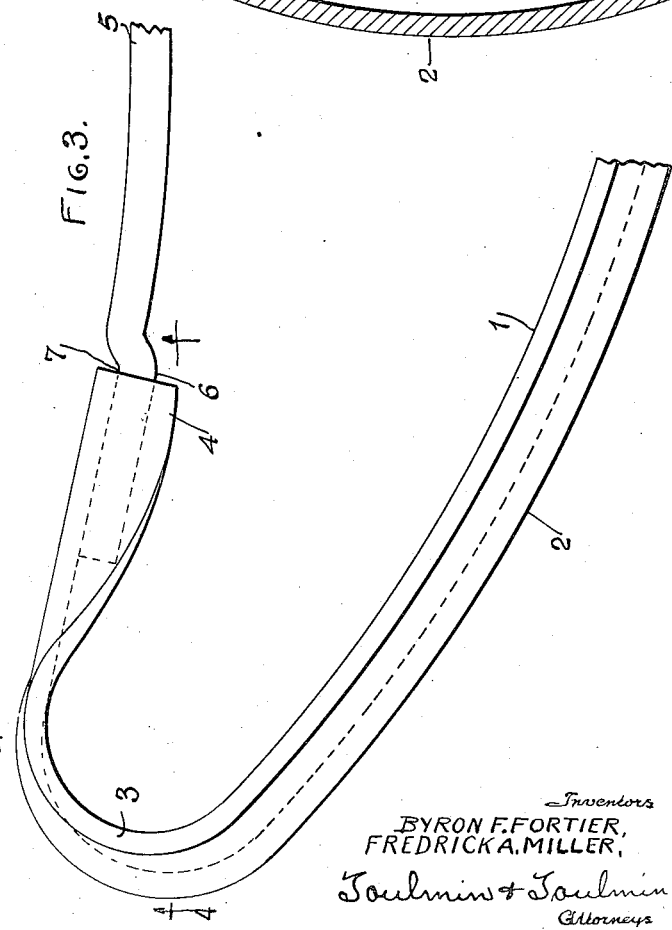
Inventors
BYRON F. FORTIER,
FREDRICK A. MILLER,
Toulmin & Toulmin
Attorneys

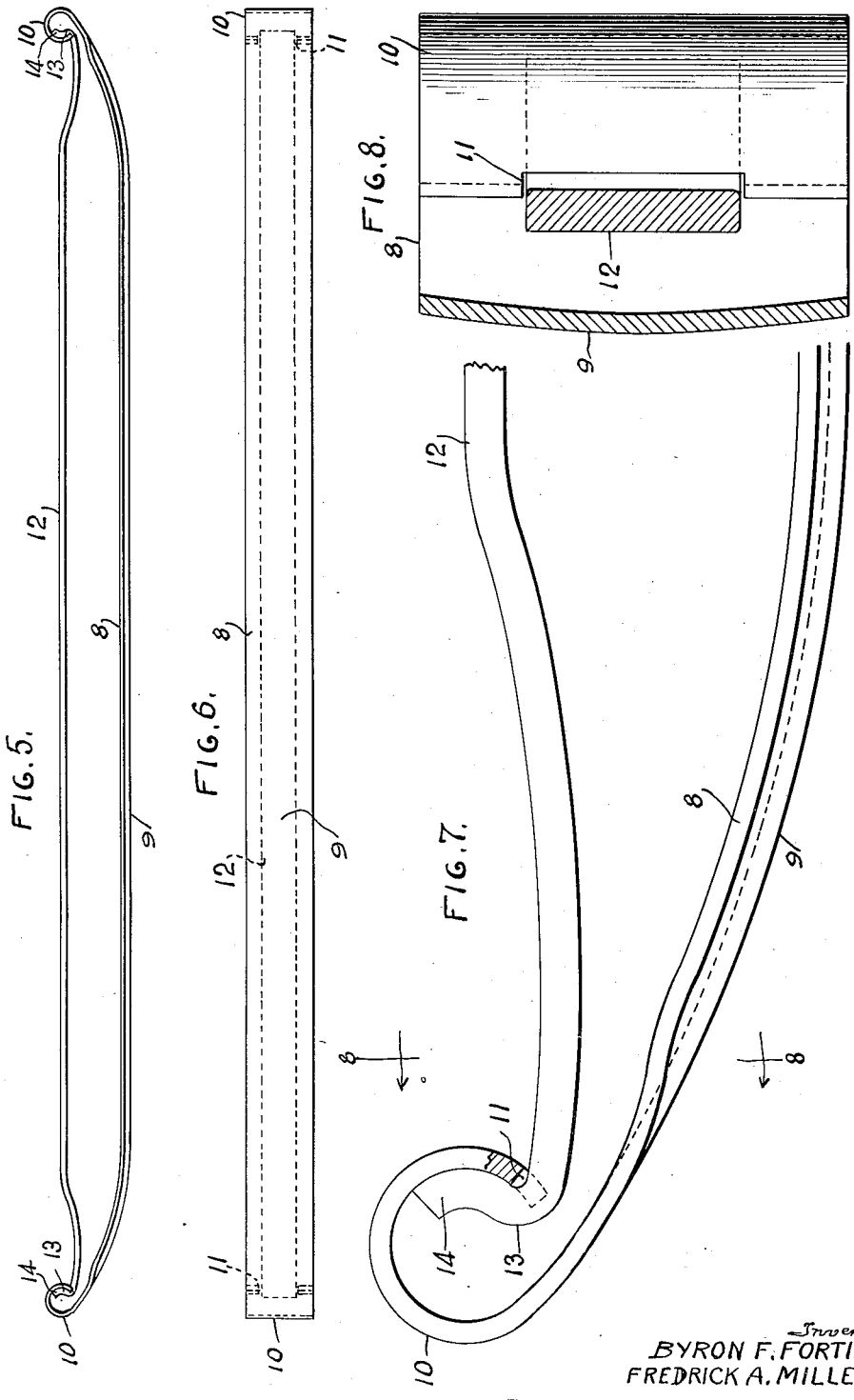

Patented Jan. 29, 1935

1,989,637

UNITED STATES PATENT OFFICE 1,989,637

METHOD OF ATTACHING BACK BAR TO FRONT MEMBER OF A BUMPER

Byron F. Fortier and Fredrick A. Miller, Springfield, Ohio, assignors to Louis R. Hildreth, Columbus, Ohio Application December 4, 1931, Serial No. 579,083

2 Claims. (Cl. 293—55)

This invention relates to improvements in bumpers, and particularly to the manner in which the front bumper member is attached to the rear bar, and has for its object to provide a bumper in which there are two bars attached to each other at their ends by a free engagement, and held in such engagement by the resiliency of the bars.

It is the object of this invention to provide a bumper having a front bumper bar and a rear bumper bar attached to each other by means of interlocking hook members on the ends of the bars, so that any impact upon the front bar will cause the engagement between the two bars to become more effective.

It is also an object of this invention to provide, in connection with a bumper, a front bar having its ends bent back and attached to the ends of a rear bar for supporting the front bar.

These and other objects and advantages will appear from the following description taken in connection with the drawings.

Referring to the drawings:

Figure 1 is a top plan view of one form of bumper.

Figure 2 is a view looking at the bumper from the bottom of Figure 1.

Figure 3 is an enlarged end view of the bumper as shown in Figure 1.

Figure 4 is a section through one end of the bumper on the line 4—4 of Figure 3.

Figure 5 is a top plan view of a modified form of bumper.

Figure 6 is a view looking from the bottom of Figure 5.

Figure 7 is an enlarged end view of the bumper as shown in Figure 5, with a part thereof removed to show the manner in which the two bars are engaged.

Figure 8 is a section on the line 8—8 of Figure 7.

In the present bumpers the bumper structure is composed of two parts united without the intervention of any other structural element. In the form shown in Figure 1 the front bar is indicated by the numeral 1, and has along its front face a rib or bead 2 extending longitudinally of the other bar, from one end to the other down the center of the bar. This bead or rib adds beauty and rigidity to the bar. The front bar is composed of some material that will take a suitable polish for the purpose of forming an attractive bumper.

Each end of the front bar is bent, as indicated by the numeral 3, to form a U-shaped loop. The free ends of the U-shaped loops are crimped or folded, as indicated by the numeral 4, for forming supports for the ends of the back bar 5. The back bar is much narrower than the front bar. It is therefore possible for the ends of the front bar to be folded or crimped to form gripping means for gripping the ends of the back bar. Each end of the back bar is offset, as indicated by the numeral 6, and projects into one of the crimped or folded ends of the front bar.

For the purpose of forming an abutment and to limit the longitudinal movement of the back bar, there is provided at the juncture of the offset and the main body of the bar, a shoulder 7. These shoulders, engaging the ends of the front bar, hold the back bar against longitudinal movement with relation to the front bar. The crimped or folded parts of the front bar are pressed tightly against the offset ends of the back bar so that the two bars are substantially rigidly united. When the two bars are united in the manner shown in Figure 3 a complete bumper is formed, as shown in Figures 1 and 2. This bumper may be attached to an automobile by any suitable means, engaging the automobile and the back bar and thereby attaching the bumper as a whole to the automobile.

In the form shown in Figure 5 the front bar is indicated by the numeral 8 and has the same longitudinal rib or bead 9 as is found in connection with the bumper bar shown in Figure 1. Each end of this front bumper bar is formed into a circular hook member 10. Each part of each hook member is concentric with each other part so that each hook will form a part of a true circle. Each end has therein a notch 11, in which is seated one end of a back bar 12.

For the purpose of engaging the ends of the front bar the back bar has on each end a hook 13, which engages over the hooked end of the front bar and seats in the notches. The free end of each hooked part of the back bar is curved, as indicated by the numeral 14, to coincide with the interior of the circular hook on the end of the front bar 8. By this hook structure the two bars are held closely engaged with each other.

When an impact is brought to bear upon the front bar the two bars are more closely interlocked, and are not disengaged by reason of the rebound when the impact is removed. The two bars are held in engagement by the hook structure, together with the resiliency of the two bars, so that when they are attached they are firmly and securely held, but may be removed by applying proper pressure to the ends of the front bar so that the hooks thereon are brought closer together, permitting the removal of the back bar. These two bars may be easily assembled and when assembled form a serviceable, rigid and efficient bumper.

It will be understood that we desire to comprehend within our invention such modifications as come within the scope of our claims and our invention.

Having thus fully described our invention, what we claim as new and desire to secure by Letters Patent, is:

1. A bumper consisting of a back bar having its ends offset to form shoulders, and a front bar, said front bar having its ends bent back and crimped around the offset ends of the back bar and engaging the shoulders.

2. A bumper consisting of a back bar having its ends offset, and a front bar having its ends bent back and crimped around the offset ends of the back bar.

BYRON F. FORTIER.
FREDRICK A. MILLER.